Dec. 1, 1970  R. M. SEAGER  3,543,402
CERAMIC CUTTING BLADE
Filed April 15, 1968
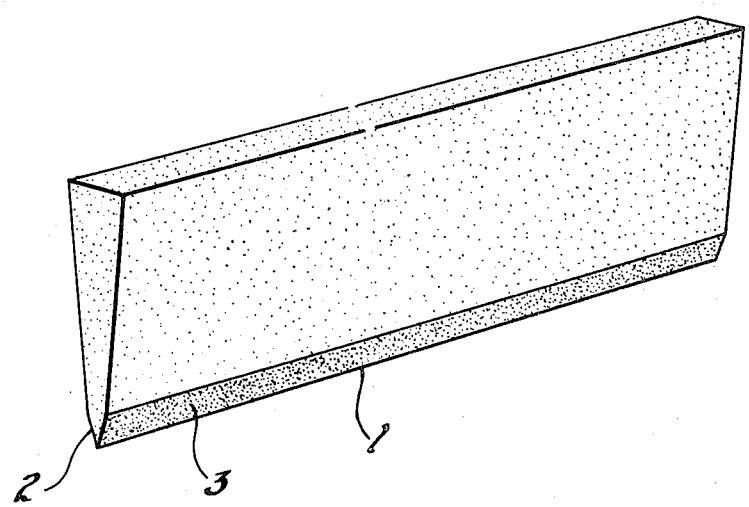
INVENTOR.
Richard M. Seager
BY
Barnard, McDlynn & Reising
ATTORNEYS 3,543,402
CERAMIC CUTTING BLADE
Richard M. Seager, Newport Beach, Calif., assignor to Coors Porcelain Company, Golden, Colo., a corporation of Colorado
Filed Apr. 15, 1968, Ser. No. 721,254
Int. Cl. B26b 21/54; B21k 11/00
U.S. Cl. 30—346.53                                        7 Claims

ABSTRACT OF THE DISCLOSURE

A cutting blade comprising a non-porous ceramic body having an elongated sharp cutting edge thereon formed by smooth surfaces of said body which are at an angle to each other of at least about 8°, said ceramic containing at least about 99.5% by weight aluminum oxide substantially all of which is in the form of randomly oriented crystals having a size not exceeding 5 microns.

---

The subject matter of the present invention is a ceramic cutting blade and method for making same and, more particularly, a ceramic cutting blade formed of high alumina ceramic having an extremely small crystal size. Ceramic blades made in accordance with the invention are particularly desirable for use where long knife edge ance are important, for example, industrial cutting blade life, without regrinding and honing, and corrosion resistance are important, for example, industrial cutting blades for cutting paper or the like, razor blades and surgical blades.

At the present state of the art, cutting blades are conventionally made of hardened steel. It is well known that for optimum durability and other characteristics, the blade material should be extremely hard in order to withstand wear, extremely tough to assure against breakage of the thin cutting edge, corrosion resistant to withstand dulling from corrosion, and receptive to the forming of an extremely sharp cutting edge by grinding, honing and polishing operations. Strictly from the standpoint of hardness and corrosion resistance, tempered steel or other metal is deficient as compared with many other materials. Glass is, for example, hard and corrosion resistant and is receptive to the forming of an extremely sharp edge. However, glass has marked deficiencies such as a lack of toughness to assure against breakage of the cutting edge particularly when formed into a thin blade. Numerous other ceramics are much harder than glass and are also tougher and more resistant to corrosion; however, they are not receptive to the forming of an extremely sharp edge, as required for a cutting blade.

The present invention stems from my discovery that an extremely sharp edge, as required for cutting paper, cloth, hair and the like, can be formed on a sintered alumina ceramic body made in accordance with U.S. Pat. 3,377,176 in the names of Vladimir E. Wolkodoff and Robert E. Weaver. The outstanding characteristic of such sintered alumina ceramic which most distinguishes it from conventional alumina ceramic bodies is that it has an extremely small crystal size. Specifically, ceramic bodies made in accordance with the aforesaid patent contain 99.5% or more by weight aluminum oxide substantially all of which is in the form of randomly oriented crystals having a size not exceeding 5 microns. In the preferred embodiment the alumina content is at least 99.9% by weight and the crystal size does not exceed 3 microns. Conventional alumina ceramics such as are in wide spread use as spark plug and other electrical insulators, pump plungers, liners, nozzles and the like have a crystal size upwards of 20 microns and generally ranging as high as 40 microns.

I have found that extremely small crystal size is essential to the attainment of an extremely sharp edge on alumina ceramic. This, I conclude, is because the intracrystalline strength of alumina is greater than the intercrystalline strength such that when abrading force is applied, as is necessary to grind and hone to a sharp edge, the occurrence of entire crystals tearing away from the body is normally greater than the occurrence of removing portions of crystals remaining in place. It would appear that with extremely small crystals the intercrystalline strength is greater than in the case where the alumina body has large crystals. This explains the extremely high physical strength of ceramic made in accordance with the aforesaid patent as compared with conventional alumina ceramics. Hence, with the small crystal structure, the crystals have less tendency to tear away under abrasion and, during edge sharpening, the result is a higher incidence of the removal of crystal portions rather than entire crystals which, in turn, means the attainment of a sharper edge. Even where the crystals do tear away under abrasion during sharpening, there is relatively little effect in the attainment of a sharp edge for the reason that the crystals are so very small. Of course, the excellent physical strength of the small crystal structure alumina ceramic is very important for the additional reason that it enables a blade which is very thin, as for razor or surgical use, but which is, nevertheless, sufficiently tough to assure against breakage.

There is a relationship between the crystal size of the alumina ceramic and the edge angle which can be effectively imparted to the blade, i.e., the angle between the two blade surfaces which form the cutting edge. Specifically, the edge angle should preferably not be less than 8° and the best edge angle is from about 10° to 40°.

The attached drawing shows one embodiment of the invention. The cutting blade shown, in enlarged scale, is one and one-half inches long, one-half inch wide and one-eighth inch thick at its thickest portion. The cutting edge 1 is formed by the two surfaces 2 and 3, the angle between these two surfaces being 12 degrees in this particular embodiment. To provide increased strength, it is desirable that the blade be of generally wedge-shaped cross section as shown; however, a flat shape can be used if desired. In accordance with the invention, the blade is of ceramic containing at least about 99.5% by weight aluminum oxide substantially all of which is in the form of randomly oriented crystals having a size not exceeding 5 microns and preferably not exceeding 3 microns. Such ceramic and the preferred method for making same are fully disclosed in the aforesaid United States patent. In the most preferred embodiment the ceramic contains about 99.9% by weight aluminum oxide and the remainder one or more metal oxides which function to inhibit crystal growth during sintering, the combination of .05% by weight magnesium oxide and .05% by weight yttrium oxide being outstandingly superior for inhibiting crystal growth. Such ceramic can be made as follows:

First, a uniform batch is formed of 99.9% by weight aluminum oxide, .05% by weight magnesium oxide and .05% by weight yttrium oxide. The batch is milled in a conventional manner by rotating in a rubber or alumina ceramic lined drum with alumina grinding balls to thoroughly mix the ingredients and to reduce particle size. It is essential that by the conclusion of the milling operation substantially all of the aluminum oxide be of submicron particle size and preferably of a particle size not exceeding .5 micron. To attain a final fired ceramic body wherein substantially all the aluminum oxide crystals are of a size not exceeding 3 microns it is highly desirable that the raw batch be reduced to a particle size not exceeding .3 micron since the smaller the prefired alumina particle size, the les the demands on the crystal growth inhibiting additives and on temperature control to inhibit crystal growth during the subsequent firing operation.

The aluminum oxide used should be a substantially soda-free and silica-free alumina of which at least about 90% is alpha-aluminum oxide.

Either during or subsequent to the milling operation it is desirable to mix into the batch a small amount of organic binder to facilitate the forming of green compacts in the next operation. As is well known in the art, the choice of organic binder and the precise amount used will depend upon the process selected for the forming of the green compacts. For example, if the green compacts are to be formed by dry pressing, as is preferred for the manufacture of the cutting blades of this invention, paraffin wax in an amount of about 3% by weight is excellent as the organic binder material. If injection molding or extrusion is to be used to form the green compacts then any of a number of thermoplastic organic resins can be used as the organic binder material as is well known in the art.

With the organic binder added, the raw batch is formed into self-sustaining green compacts, the degree of compaction preferably being such as to provide a green compact density of at least about 2 grams per cubic centimeter. For cutting blades of relatively simple shape, dry pressing in matched metal dies is excellent though hydrostatic pressing can be used if desired. Since the green compacts are easily machinable, it is not necessary that the batch be pressed to the final shape desired. For example, where a wedge-shaped blade, such as that shown in the drawings is desired, the batch can be pressed into flat rectangular compacts and these compacts then machined to remove wax-binded ceramic from the opposed flat sides and form the compacts into the desired wedge-shape. Particularly for high production, it is also feasible to form the green compacts by injection molding or by extruding or casting the batch into a ribbon which can then be cut to provide the desired blade sizes. Like dry pressing, these processes of forming ceramic into prefired green bodies by injection molding or by casting or extrusion, are well known in the art.

As the next step, the green compacts are fired to a temperature of from 1400° to 1550° C. to sinter the ceramic. Firing in a hydrogen atmosphere or a vacuum is excellent but not essential. An ordinary oxidizing atmosphere is satisfactory and is less expensive. The organic binder vaporizes or burns out during the initial stages of the firing operation. Control of the firing temperature to within the range specified is important to the attainment of good sintering while at the same time inhibiting excessive crystal growth. The prefired ceramic compacts should, of course, be of a shape as close as possible to the final shape desired for the cutting blades since after firing the ceramic is extremely hard and it is important to keep machining operations at this stage to a minimum. Since there is considerable shrinkage during firing, the prefired compacts must be made to larger size than that desired for the final fired body.

The ceramic blade blanks made as outlined above have the desired aforedescribed small crystal structure and a density of about 3.97 or higher. For additional information regarding processing, reference is here again made to the aforesaid United States patent.

The ceramic blade blanks are then formed into cutting blades by abrading the surfaces which form the cutting edge to the desired angle and by honing. A diamond grinding wheel of about size 100 grit can be effectively used to grind the the surfaces (surfaces 2 and 3 in the drawing) to form the cutting edge, and a 400 grit diamond lap can be used to home the surfaces to attain the extremely sharp cutting edge 1. The edge can be further enhanced by polishing the surfaces 2 and 3 with diamond polishing paste. For most uses, the cutting edge angle, (i.e., the angle between the surfaces 2 and 3 which form the cutting edge) should preferably be from about 10° to 40° and the surface smoothness of the surfaces, 2 and 3, should be less than 5 micro-inches RMS and preferably less than 1 micro-inch RMS and with the cutting edge having a cross-sectional radius at the extreme edge thereof, of less than 10 microns and preferably less than 5 microns. Where increased blade strength and ruggedness is a requirement as, for example, in many industrial cutting blades, a larger cutting edge angle can, of course, be used though an edge angle of greater than 90° will generally not be desirable.

The outstanding advantage of a cutting blade made in accordance with the present invention is its marked ability to retain its extremely sharp cutting edge over an extended period of use, this because of the extreme hardness and corrosion resistance of the blade. The hardness of the ceramic is about 90–91 on the Rockwell 45N scale. The ceramic can be ground and polished to a surface smoothness of less than 1 micro-inch RMS. The extremely high density of about 3.97 grams per cubic centimeter, or higher, means that the ceramic is substantially completely free of pours. Further, the ceramic is extremely tough as compared with other ceramics as evidenced by the following characteristics of the ceramic. Compressive strength—greater than 650,000 p.s.i.; flexural strength—greater than 105,000 p.s.i.; tensil strength—about 60,000 p.s.i. Hence, the cutting blades of this invention are amply resistant to breakage from normal use.

Whereas in the blade shown in the drawing, the cutting edge 1 is straight, it will be understood that it can be of another shape such as sinuous, as often used for steak or other household knives, or circular (formed on the edge of a disc) as is useful for many types of industrial cutting blades. Hence, it will be understood that while the invenvention has been described specifically with reference to a preferred embodiment thereof, various changes and modifications may be made all within the full and intended scope of the claims which follows:

The embodiments of the invention in which an exclusive property or privilege is claimed are defined as follows:

1. A cutting blade comprising; a ceramic body having an elongated sharp cutting edge formed by two surfaces of said body which are at an angle to each other of at least about 8° and which have a surface smoothness of less than 5 micro-inches RMS, said ceramic containing at least about 99.5% by weight aluminum oxide substantially all of which is in the form of randomly oriented crystals having a size not exceeding 5 microns.

2. A cutting blade as set forth in claim 1 wherein said two surfaces are at an angle to each other of from about 10° to 40°.

3. A cutting blade as set forth in claim 1 wherein said ceramic has a density of at least about 3.97 grams per cubic centimeter and contains at least about 99.9% by weight aluminum oxide substantially all of which is in the form of randomly oriented crystals having a size not exceeding 3 microns.

4. A cutting blade as set forth in claim 1 wherein said ceramic body has a generally wedge-shaped cross section.

5. A cutting blade as set forth in claim 1 wherein said cutting edge has a cross sectional radius of less than about 10 microns.

6. A method for making a cutting blade comprising; forming a sintered ceramic body having two surfaces at an angle to each other of at least about 8°, said body containing at least about 99.5 percent by weight aluminum oxide substantially all of which is in the form of randomly oriented crystals having a size not exceeding 5 microns, and then abrading said surfaces to a finish of less than 5 micro-inches RMS to form a sharp cutting edge on said body.

7. A method as set forth in claim 6 wherein said surfaces are at an angle to each other of from about 10° to 40°.

References Cited

UNITED STATES PATENTS 2,244,053   6/1941   Comstock.

FOREIGN PATENTS 6,708,227   12/1967   Netherlands.

JAMES L. JONES, JR., Primary Examiner

U.S. Cl. X.R.

76—104